United States Patent
Totale et al.

(10) Patent No.: US 10,432,549 B1
(45) Date of Patent: Oct. 1, 2019

(54) METHOD AND SYSTEM FOR SCOPE-SENSITIVE LOADING OF SOFTWARE RESOURCES

(71) Applicant: EMC Corporation, Hopkinton, MA (US)

(72) Inventors: Sachin Gopaldas Totale, Pleasanton, CA (US); Himawan Soedarsono, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 15/197,368

(22) Filed: Jun. 29, 2016

(51) Int. Cl.
*H04L 12/911* (2013.01)
*H04L 29/08* (2006.01)

(52) U.S. Cl.
CPC .............. *H04L 47/70* (2013.01); *H04L 67/02* (2013.01)

(58) Field of Classification Search
CPC ................................ H04L 47/70; H04L 67/02
See application file for complete search history.

(56) References Cited

U.S. PATENT DOCUMENTS

| | | | | |
|---|---|---|---|---|
| 5,699,512 A * | 12/1997 | Moriyasu | ................ | G06F 21/14 726/30 |
| 8,973,021 B1 * | 3/2015 | Lewine | ................... | G06F 3/048 719/329 |
| 2004/0237082 A1 * | 11/2004 | Alcazar | ..................... | G06F 8/61 717/174 |
| 2008/0066002 A1 * | 3/2008 | Nauerz | ................ | G06F 3/0482 715/762 |
| 2008/0244540 A1 * | 10/2008 | Feblowitz | ................ | G06F 8/10 717/143 |
| 2013/0122982 A1 * | 5/2013 | Laor | ....................... | G06F 13/10 463/16 |
| 2013/0198162 A1 * | 8/2013 | Refer | .................. | G06F 16/9537 707/710 |
| 2014/0053064 A1 * | 2/2014 | Weber | ................. | G06F 17/2247 715/235 |
| 2014/0082613 A1 * | 3/2014 | Kundu | ...................... | G06F 8/63 718/1 |
| 2016/0359750 A1 * | 12/2016 | Miklos | .................... | H04L 47/24 |

OTHER PUBLICATIONS

Lucia et al., "Role Based Reengineering of Web Applications", IEEE Computer Society, Proceedings of the 2005 Seventh IEEE International Symposium on Web Site Evolution, 8 pages. (Year: 2005).*

Schutt et al., "Cloud Software Development Platforms: A Comparative Overview", IEEE SERA 2016, Jun. 8-10, 2016. (Year: 2016).*

\* cited by examiner

*Primary Examiner* — Brian J. Gillis
*Assistant Examiner* — Chhian (Amy) Ling
(74) *Attorney, Agent, or Firm* — Chamberlain, Hrdlicka, White, Williams & Aughtry (57) ABSTRACT

A method for scope-sensitive loading of software resources in web applications. The method includes obtaining, from a web browser, a request for a web application and obtaining a scope of the requested web application. The scope determines required web application functionalities. The method further includes, based on the scope, generating a list of required software resources that implement the required web application functionalities, collecting the required software resources, based on the list of required software resources, and providing the collected required software resources to the web browser.

14 Claims, 6 Drawing Sheets

METHOD AND SYSTEM FOR SCOPE-SENSITIVE LOADING OF SOFTWARE RESOURCES

BACKGROUND

A web application is a software application that executes in a web browser. Prior to the execution of the web application, a web server needs to provide the required software resources, such as scripts, to the web browser.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to the loading of software resources pertaining to functionalities of web applications. A web application may be a collection of scripts and other executable content, e.g., JavaScript code, Hypertext Markup Language (HTML) code, Cascading Style Sheets (CSS) code, that may be stored on an application server. These scripts and/or other content may be executable in a web browser, thus forming the web application. Accordingly, when a user requests the web application, the web server may provide these software resources to the web browser.

In one or more embodiments of the technology, the software resources to be provided to the web browser, in response to the web browser's request for the web application, are selected to include only the necessary software resources, in a suitable order, while avoiding the sending of resources that may not be required for the execution of the web application.

In one embodiment of the invention, what constitutes a required software resource may be determined based on the scope of the web application to be executed in the browser. The scope of the web application may be governed by factors that affect what functionalities of the web application are needed. Factors that affect the features to be made available in the web application may include, for example, user privileges, the user role, the user language, the user's geographic location, the type of device on which the web application is to be executed (user device), an application version, an operating system version, a software as a service (Saas) tenant name, subscription name and/or subscription plan, available integration services (such as, e.g., document signing/approval services, electronic maps services), etc. Consider, for example a scenario in which user A has user privileges allowing her to access all aspects of the web application versus user B that has user privileges that allow him to only access a particular module of the web application. In this scenario it may be desirable to only load the relatively few software resources directed to the module that user B is authorized to access when user B requests the web application. In contrast, it may be desirable to load more or even all web application related software resources when user A requests the web application. Similarly, if a web application is requested from a location (e.g. a country) where certain application features are not available, software resources corresponding to application modules that are not available may not be provided to the web browser.

In one or more embodiments of the technology, the functionalities of web applications are hierarchically organized. The hierarchical organization of the functionalities may facilitate the selection of required software resources, based on dependencies that may be identified in the hierarchical organization. The selection of software resources to be provided based on the scope of the web application to be executed and the use of the hierarchical organization of the web application functionalities to facilitate the selection of required software resources are described below with reference to FIGS. 3-5.

Figure 1:
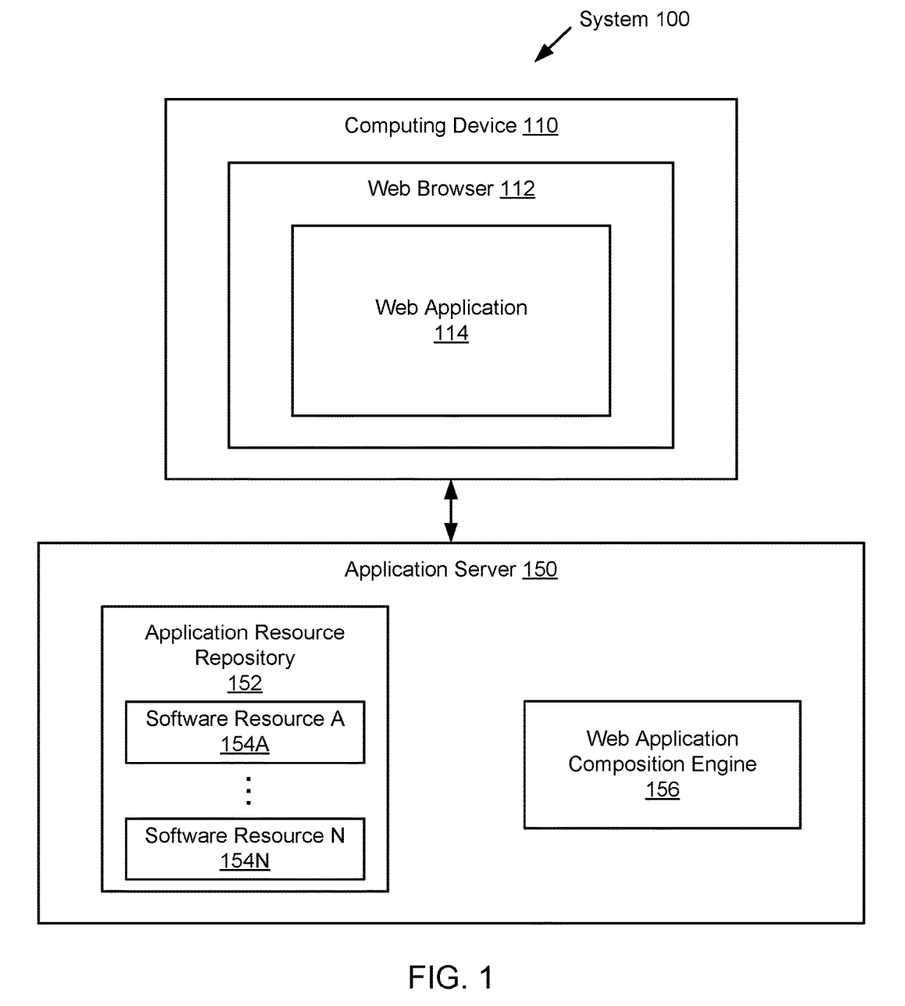
FIG. 1 shows a system in accordance with one or more embodiments of the technology.

FIG. 1 shows a schematic diagram of a system in accordance with one or more embodiments of the technology. Specifically, FIG. 1 shows a schematic diagram of a system (100) that allows a user to interact with a web application (114) executing in a web browser (112) on a computing device (110). As shown in FIG. 1, the system further includes an application server (150). Each of these components is described in detail below.

As previously noted, the system (100), in accordance with one or more embodiments of the technology, includes a computing device (110). The computing device may be similar to the exemplary computing device shown in FIG. 6, and may be any type of mobile, desktop, server, embedded, or other hardware capable of performing at least one of the steps described below with reference to FIGS. 3-5. The computing device may be connected to a network (not shown) (e.g., a local area network (LAN), a wide area network (WAN) such as the Internet, mobile network, or any other type of network) via a network interface connection (not shown), thereby enabling the computing device to communicate with the application server (150).

In one or more embodiments of the technology, the computing device (110) may have executing thereon a web browser (112). The web browser may provide a platform for the execution of a web application (114), which may be displayed to the user of the computing device as one or more web pages. The web browser may be a software application for retrieving, presenting and traversing content resources (e.g., documents formatted and annotated with hypertext markup language (HTML), JavaScript, Cascading Style Sheets (CSS), and any language and/or any other language extensions necessary for executing the web application (114)).

In one or more embodiments of the technology, the web browser (112) may host the web application (114). The web application may be web browser-executable code (including, e.g., HTML, JavaScript and/or CSS elements) that includes various functionalities. The user of the web application may utilize these functionalities via the web pages displayed in the web browser. When a user initially accesses the web application (114), the application server (150) may provide the software resources (e.g., HTML, JavaScript and/or CSS elements) that form the web application, as described below with reference to FIGS. 3-5. The web browser may subsequently execute the received software resources.

Continuing with the discussion of the system (100), shown in FIG. 1, the application server (150) includes an application resource repository (152) and a web application composition engine (156). The application server may be executing on a computing device similar to the exemplary computing device shown in FIG. 6. The computing device executing the application server may include physical or virtual server hardware including at least a processor, memory, persistent storage, and a communication interface. The application server (150) may be on-premises, operated by the legal entity (e.g. the company) providing, using and/or administrating the system (100). Alternatively, the application server may be hosted by a third party, e.g., in a datacenter. Further, the application server may be cloud-based, e.g. the application server may provide its services as a software as a service (SaaS). Although a single application server (150) is shown in FIG. 1, components of the application server may be distributed over multiple computing devices, either locally or remotely. The application server may be connected to a network (e.g., a local area network (LAN), a wide area network (WAN) such as the Internet, mobile network, or any other type of network) via a network interface connection (not shown), thereby enabling the application server to communicate with the computing device (110).

The web browser (112), executing on the computing device (110) may connect to the application server (150) to request the web application (114), e.g., when the web application is called by a user. In response to the request received from the web browser, the application server (150) may return the required software resources (e.g., software modules such as HTML, JavaScript and/or CSS elements) to the web browser.

In one or more embodiments of the technology, the software resources associated with the web application (114) may be stored in the application resource repository (152). The application resource repository may store any number of software resources (154A-154N). These software resources may include, but are not limited to, HTML, JavaScript and CSS elements, but they may also include data sets such as audio, image, video and text content that may be related to the web application and/or to the use of the web application. Those skilled in the art will appreciate that any type of data or code may be considered a software resource. The application resource repository (152) may be, for example, a folder, a group of folders, a database or any other type of data storage suitable for storing the software resources (154A-154N) on a non-volatile (persistent) storage device including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM). Further, the application resource repository (152) may be implemented using a redundant array of independent disks (RAID), network attached storage (NAS), cloud storage, etc. Further, at least some of the content of the application module repository may alternatively or in addition be stored in volatile memory, e.g., Dynamic Random-Access Memory (DRAM), Synchronous DRAM, SDR SDRAM, and DDR SDRAM.

Continuing with the discussion of FIG. 1, in one or more embodiments of the technology, the system (100) includes the web application composition engine (156). The web application composition engine (156) executes software instructions in the form of non-transitory computer readable program code described in detail below, with reference to FIGS. 3-5. The instructions may enable the web application composition engine (156) to select, from the software resources (154A-154N), a set of required software resources to be provided to the web browser (112), in response to a user requesting the web application (114). The software resources selected by the web application composition engine, when executed by the web browser, may form the web application.

One skilled in the art will recognize that the architecture of the system is not limited to the components shown in FIG. 1. For example, the system may rely on multiple application servers and accordingly the web application may also communicate with multiple application servers. For example, one application server may primarily provide executable scripts, whereas another application server may provide content for the web application. Further, the execution of the web application may also not be limited to operation within a browser window. The application may, for example, be executed without requiring a browser window. Also, even though only a single web application is shown in FIG. 1, those skilled in the art will recognize that systems in accordance with one or more embodiments of the technology may include multiple/many web applications. These web applications may execute on multiple computing devices and may be accessed by different users.

Figure 2:
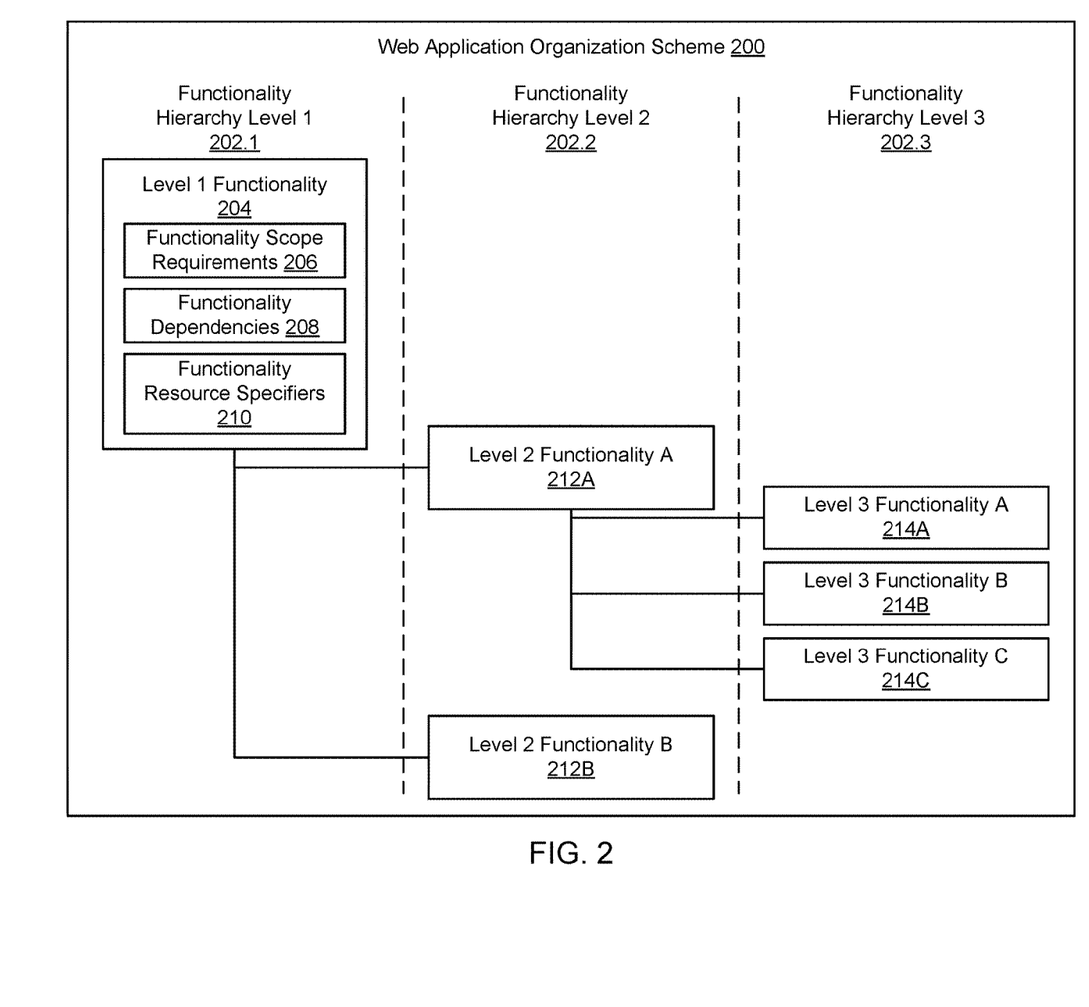
FIG. 2 shows an exemplary web application organization scheme in accordance with one or more embodiments of the technology.

FIG. 2 shows an exemplary web application organization scheme (200) of a web application (114), in accordance with one or more embodiments of the technology. The functionalities of a web application may be hierarchically organized, e.g., in a tree-like structure. In the exemplary web application organization scheme shown in FIG. 2, the web application is organized in three functionality hierarchy levels (202.1-202.3). Top level functionalities (e.g., broadly used functionalities) may be located in functionality hierarchy level 1, whereas more specialized functionalities may be located in hierarchy levels 2 and/or 3. In the exemplary web application organization scheme (200), hierarchy level 1 (202.1) includes the level 1 functionality (204). The level 1 functionality (204) may include fundamental components of the web application, such as universally used commands, menu structures, visualization elements, etc. The exemplary web application organization scheme (200) further includes two level 2 functionalities (212A, 212B), in functionality hierarchy level 2 (202.2). Multiple level 2 functionalities may exist in order to separate distinct functionalities. For example, level 2 functionality A (212A) may be a task management module, whereas level 2 functionality B (212B) may be an accounting module. Functionality hierarchy level 3 (202.3) includes an additional level of granularity, in which individual functionalities are distinguished. For example, level 3 functionalities (214A-214C), in the exemplary web application organization scheme (200), are organized under level 2 functionality A (212A), and include particular task management functionalities. For example, level 3 functionality A (214A) may include a functionality for generating task lists, level 3 functionality module B (214B) may include a functionality for performing task searches, and level 3 functionality module C (214C) may include a functionality for generating a task history. As illustrated in FIG. 2, functionalities become increasingly specific, in the direction from functionality hierarchy level 1 (202.1) to functionality hierarchy level 3 (202.3).

In one or more embodiments of the technology, a web application (114) includes a subset of functionalities selected from the functionalities included in the web application organization scheme (200) (e.g., (204, 212A, 212B, 214A-214C)). The subset of functionalities to be included in the web application is determined as subsequently discussed.

In one or more embodiments of the technology, functionality scope requirements (206) and/or functionality dependencies (208) may be assigned to one or more of the functionalities (204, 212A, 212B, 214A-214C) in the web application organization scheme (200). Although in FIG. 2, functionality scope requirements and functionality dependencies are only shown for the level 1 functionality (204), functionality scope requirements and/or functionality dependencies may be assigned to any of the functionalities (204, 212A, 212B, 214A-214C).

A functionality scope requirement, in accordance with an embodiment of the technology, establishes one or more requirements that need to be met in order to make the associated functionality available in the web application. Accordingly, functionality scope requirements may be used in order to control what functionality is to be made available in a web application, as described in FIGS. 3-5. A functionality scope requirement may be, for example, the need for certain user privileges, based on a user name or a user group, a required subscription level, a required geographic location, a required type of device on which the web application is to be executed, etc. If those functionality scope requirements are met the associated functionality may be made available in the web application. Those skilled in the art will appreciate that any criterion based on which functionality may or may not be made available in a web application may be included in the functionality scope requirements. If the functionality scope requirements associated with a functionality are met, the software resource required by the functionality may be provided to the web browser, as subsequently described in FIGS. 3-5. Alternatively, if the functionality scope requirements associated with a functionality are not met, the software resources required by the functionality may not be provided to the web browser, thus avoiding the sending of unnecessary software resources to the web browser.

As noted above, functionality dependencies (208) may further be assigned to a functionality. A functionality dependency, in accordance with an embodiment of the technology, identifies prerequisite functionalities that are necessary for the execution of the functionality. Accordingly, a functionality dependency may trigger the loading of software resources associated with prerequisite functionalities.

Above-described functionality dependencies are explicitly stated, e.g., in a file. In addition, a web application organization scheme, in accordance with an embodiment of the technology, also includes implicitly stated functionality dependencies resulting from the hierarchical organization of the web application itself. Specifically, functionality dependencies may be established by the tree-like structure of the functionalities of the web application. Consider, for example, a particular level 3 functionality that is a child of a level 2 functionality (e.g., level 3 functionality A (214A) being a child of level 2 functionality A (212A)). As a result, the level 2 functionality is implicitly declared a prerequisite functionality of the level 3 functionality A (214A) without having to explicitly list the level 2 functionality under the functionality dependencies of level 3 functionality A (214A). In contrast to these implicitly stated functionality dependencies, explicitly stated functionality dependencies may be used to express dependencies that are not implicitly established by the tree-like structure of the web application functions. For example, if the existence of level 3 functionality A (214A) is a prerequisite for the execution of level 3 functionality module C (214C), a functionality dependency associated with level 3 functionality C may specify level 3 functionality A as a prerequisite functionality. In such a scenario, software resources associated with level 3 functionality A may be included in the web application, even in cases in which level 3 functionality A otherwise would not have been included in the web application.

In one embodiment of the technology, a functionality is associated with certain software resources (for example with HTML, JavaScript and/or CSS elements that implement the functionality). These software resources may be stored in the application resource repository (152). In one embodiment of the technology, functionality resource specifiers (e.g., functionality resource specifier (210), associated with level 1 functionality (204)) may be used to identify, from the set of software resources (154A-154N) in the application resource repository (152), the resources associated with the functionality. Separate functionality resource specifiers may be used to specify required resources for the different functionalities in the web application organization scheme (200). In one embodiment of the technology, a software resource may also be non-executable data, e.g. a configuration file, an audio file, a video file, a spreadsheet, or any other type of data that a functionality may access.

One skilled in the art will recognize that the organization of web applications, in accordance with one or more embodiments of the technology, is not limited to the web application organization scheme shown in FIG. 2. For example, a web application may include any number of hierarchies and any number of functionalities, placed within the web application scheme, without departing from the technology.

In one embodiment of the technology, the functionality scope requirements, the functionality dependencies and the functionality resource specifiers are stored in a configuration file. Separate configuration files may exist for the different functionalities in the web application organization scheme, or a single configuration file may be used to store functionality scope requirements, functionality dependencies and/or functionality resource specifiers for all functionalities in the web application organization scheme. In one embodiment of the technology, the configuration file uses the JavaScript Object Notation (JSON) format.

Figure 3:
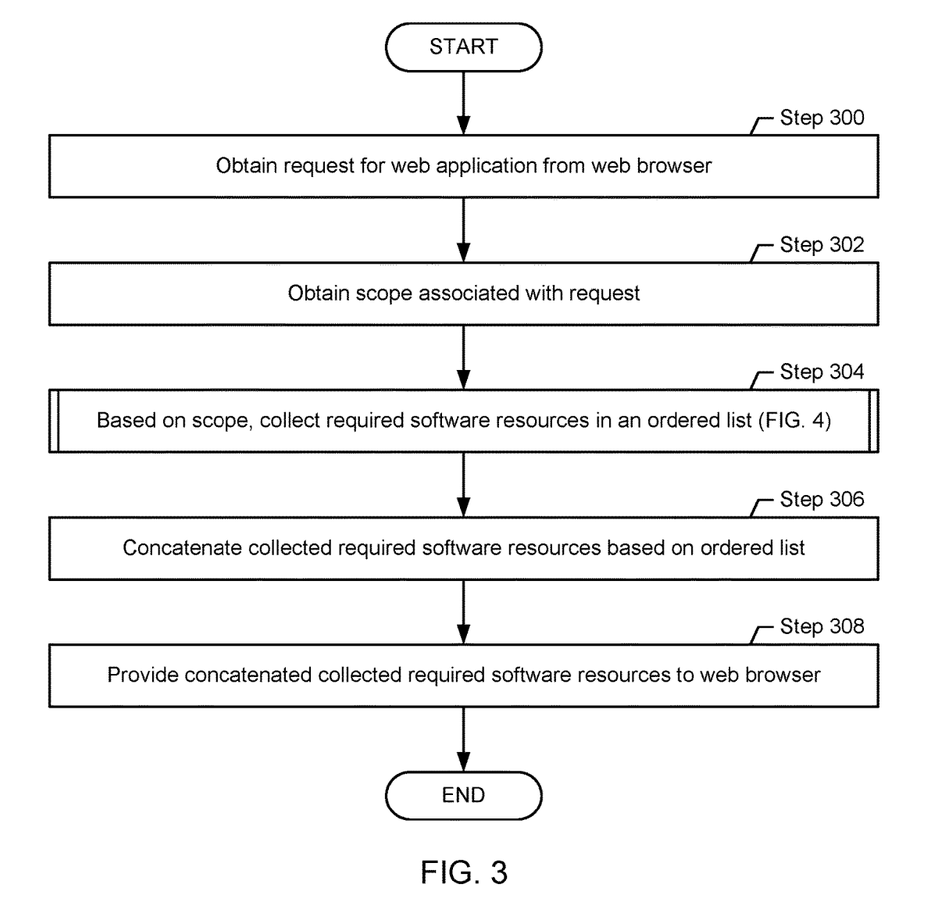
FIGS. 3-5 show flowcharts in accordance with one or more embodiments of the technology.
Figure 4:
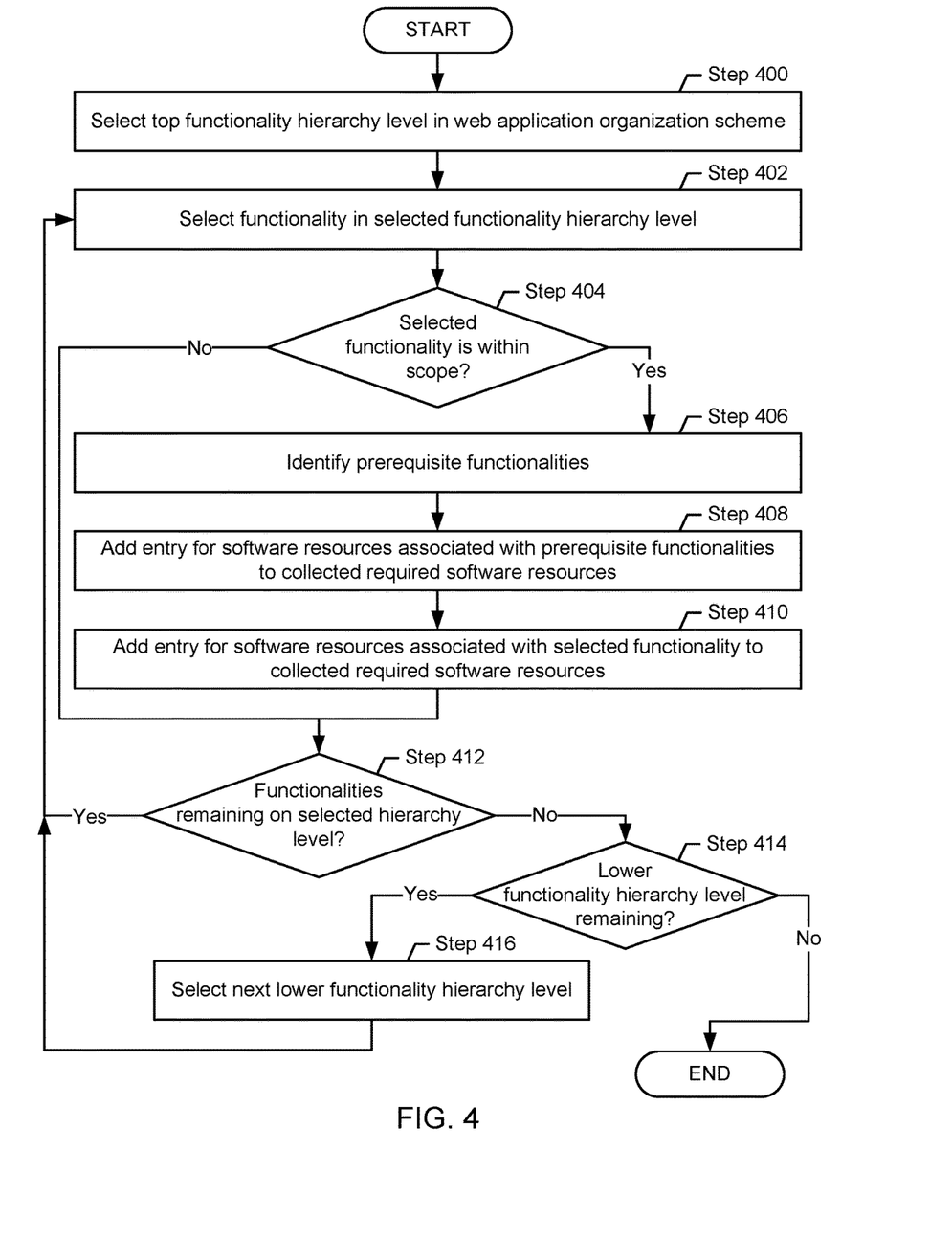
Figure 5:
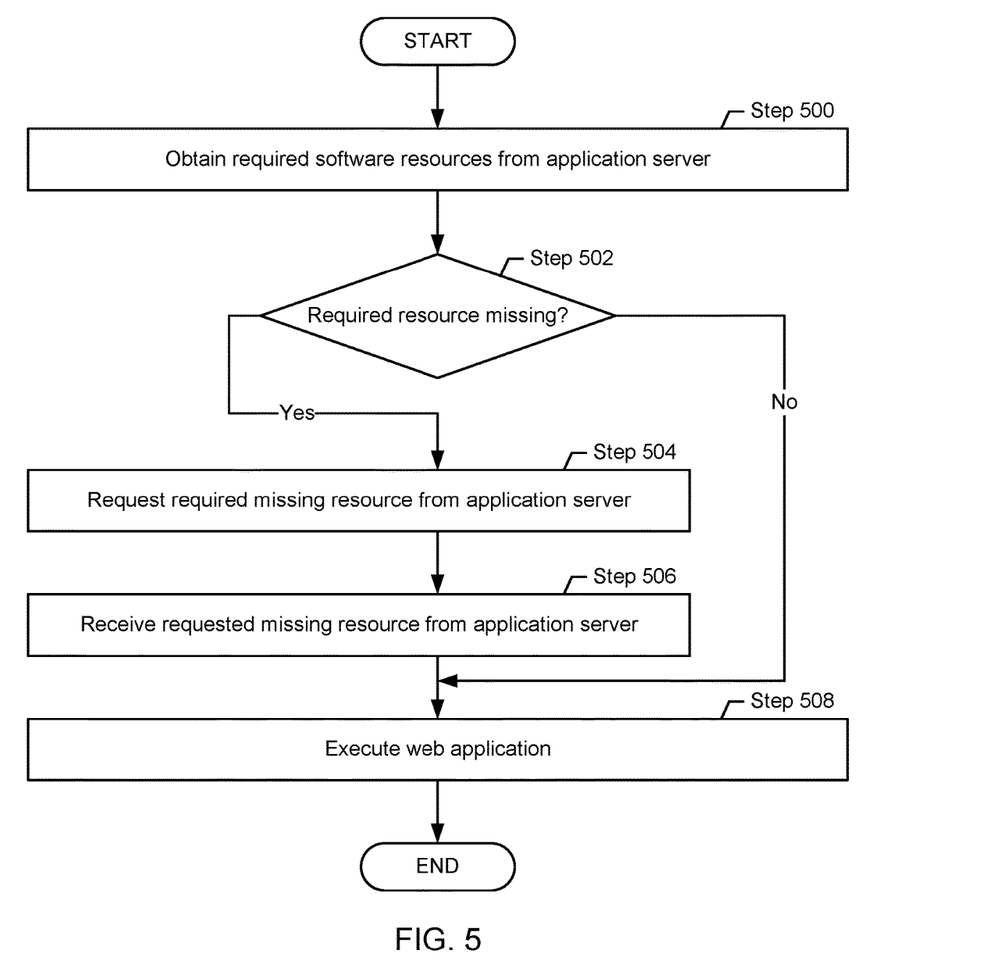

FIGS. 3-5 show flowcharts in accordance with one or more embodiments of the technology.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-5 may be performed in parallel with any other steps shown in FIGS. 3-5 without departing from the technology.

FIG. 3 shows a method for determining the software resources to be included in the collection of software resources that form the web application to be provided to the web browser. The method shown in FIG. 3 may be executed each time a web application is requested, e.g., when a user attempts to access the web application via the web browser.

Turning to FIG. 3, in Step 300, a request for a web application is obtained by the application server. The request may be received from a web browser executing on a user's computing device. The request may be, for example, a hypertext transfer protocol (HTTP) GET request that specifies the web application.

In Step 302, a scope associated with the request for the web application is obtained. A scope may include, for example, a user name, a user group, a geographic location, the type of device on which the web application is to be executed, and/or other previously discussed elements specific to the circumstances under which the web application is to be used. The scope may have been provided along with the request received in Step 300, or using additional communications between the application server and the browser. For example, the user name may be obtained, via a popup window requesting user authentication.

In Step 304, an ordered list of required software resources is generated by the web application composition engine of the application server, based on the scope obtained in Step 302. For example, in a scenario in which the scope is determined based on a user's privileges, generating the ordered list may involve identifying all software resources that are related to the functionalities that the user is authorized to access, based on his user privileges. Consider the exemplary web application shown in FIG. 2 and further assume that the user privileges enable the user to access the level 1 functionality and level 2 functionality B but not level 2 functionality A. As a result, the necessary software resources associated with the level 1 functionality and level 2 functionality B are identified. These identified resources are then listed in an order in which the resources are to be loaded when starting the web application. The generation of the ordered list of required software resources is described in detail below, with reference to FIG. 4.

In Step 306, the collection of required software resources that, when executed by the web browser, forms the web application, is established, based on the ordered list of required software resources. The required resources may be identified, based on the ordered list, in the application resource repository. Next, the identified executable software resources (e.g., HTML code, JavaScript code and/or CSS code), are concatenated into one or more script files to be provided to the web browser. The executable software resources may be arranged in the order specified in the ordered list, such that dependencies may be resolvable by the web browser executing the script file(s).

In Step 308, the script file(s) that include the concatenated collection of required software resources are provided to the web browser on the user's computing device. The one or more script files and, optionally, other non-executable software resources may be specified, for example, in an "index.html" file in the directory accessed by the web browser when requesting the web application. Thus, the web browser may automatically be directed to the location from where it may obtain all required software resources. Alternatively, the script files and, optionally, other non-executable software resources may be directly sent to the web browser.

FIG. 4 shows a method for generating a list of required resources, in accordance with one or more embodiments of the technology. The method, in accordance with an embodiment of the technology, steps through the hierarchically organized web application functionalities (e.g., web application organization scheme (200) in FIG. 2) in order to identify software functionality resources that are required in the web application, based on the scope obtained in Step 302.

In Step 400, the top functionality hierarchy level in the web application organization scheme is selected.

In Step 402, a functionality is selected in the selected functionality hierarchy level.

In Step 404, a determination is made about whether the selected functionality is within the scope of the web application to be executed. The determination may be made by comparing the functionality scope requirements associated with the functionality with the scope obtained in Step 302. If a matching scope is found (e.g., because the user name provided by the user during an authentication is detected in the functionality scope requirements), the method may proceed to Step 406 in order to add the functionality to the list of required software resources, as described in Steps 406-410. If a determination is made that the selected functionality is not within the scope, the method may proceed to Step 412 without adding the functionality to the list of required software resources.

In Step 406, prerequisite functionalities are determined. In one embodiment of the technology, prerequisite functionalities are identified by examining the functionality dependencies of the selected functionality.

In Step 408, for each prerequisite functionality, the software resources affiliated with the prerequisite functionality are identified, and the identified software resources are entered in the list of required resources. In one embodiment of the technology, the entry for the prerequisite functionality in the list of required resources is placed before the entries for the selected functionality itself, thus ensuring that the list of required resources names the required resources in the order that they are required. If software resources are loaded in the order specified by the ordered list, a prerequisite software resource will be available when the resource that requires the prerequisite resource is loaded.

If a prerequisite functionality, identified in Step 406, requires additional prerequisite functionalities, the software resources associated with these additional prerequisite functionalities may be added to the list of required resources as well.

In Step 410, an entry is made for the software resources associated with the selected functionality in the list of required resources. The entry may include all software resources specified by the selected functionality's resource specifiers.

In Step 412, a determination is made about whether functionalities are remaining on the selected hierarchy level. If functionalities are remaining, the method may return to Step 402 to repeat Steps 402-410 for the remaining functionalities. If a determination is made that no functionalities are remaining on the selected hierarchy level, the method may proceed to Step 414.

In Step 414, a determination is made about whether a lower functionality hierarchy level is remaining. If a lower functionality hierarchy level is remaining, the method may proceed to Step 416, where the next lower functionality hierarchy level is selected in order to repeat Steps 402-414 for this next lower functionality hierarchy level.

After the completion of the method described in FIG. 4, a complete list of all software resources required for the web application, within the specified scope, is available. In one embodiment of the technology, the list of required resources includes the resources in the order required for the execution of the web application, e.g., software resources that are required early during the loading of the web application, by the web browser, are listed before software resources that are required later.

Those skilled in the art will appreciate that while the hierarchically organized functionalities in the method described in FIG. 4 are processed in a particular order, from top level to bottom level, the functionalities may alternatively processed in a different order, e.g., from bottom level to top level.

FIG. 5 shows a method for loading a web application, by a web browser, in accordance with an embodiment of the technology. With the completion of the method of FIG. 3, a set of required software resources, forming the web application to be executed by the web browser, has been generated. In the steps of the method shown in FIG. 5, the web browser obtains the required software resources and begins executing the web application.

Turning to FIG. 5, in Step 500, the web browser obtains the required software resources from the application server. Step 500 corresponds to Step 308 of FIG. 3, in which the required software resources are provided by the application server. The web browser may either load the required software resources as instructed, e.g. using an "index.html" file on the application server, or it may directly receive the required software resources by the application server pushing the required software resources. The web browser may load these resources into the memory and may begin processing the resources, e.g., by interpreting and executing the instructions included in the script resources and/or by other operations appropriate for non-executable content such as audio or video content and other types of data. The processing of a resource may begin immediately after a resource has been loaded or, alternatively, it may be delayed until all resources have been obtained from the application server.

In Step 502, a determination is made about whether a resource is missing. A resource may be missing, for example, if a resource relies on another resource that has not been properly specified in a functionality dependency. If a determination is made that a required resource is missing, the method may proceed to Step 504. If no required resource is missing, the method may proceed directly to Step 508.

In Step 504, the web browser requests the missing resource from the application server, and in Step 506, the web browser receives the missing resource, in response to the request. The deferred loading of the missing resource may be performed, for example, by a browser plugin.

In Step 508, the web application is executed. Alternatively, the execution of at least parts of the web application may begin earlier, e.g., once at least some of the required resources have been received, in Step 500.

Embodiments of the technology may enable a system to load software resources of a web application. In one embodiments of the technology, only required, but not unnecessary software resources are loaded when a web application is started, thus increasing the efficiency of the web application loading process. The required software resources may be provided to the web browser in a single HTTP communication. What constitutes a required software resource is determined at the time when the web application is requested by a user. Specifically, only software resources that, based on the scope of the requested web application are required, are selected for being provided. Accordingly, embodiments of the technology enable the system to generate custom-tailored sets of software resources for functionalities according to the scope of the web application to be executed, without including unnecessary software resources.

In comparison to web applications for which all available software resources are loaded without consideration of the scope of the application to be executed, the above-described method for loading software resources thus reduces the amount of data affiliated with providing the software resources to the web browser. Further, the required software resources are provided in an order that addresses interdependencies between required software resources.

Thus, scope-sensitive web applications, in accordance with one or more embodiments of the technology are smaller and load faster than web applications that are not scope-sensitive, without compromising features available to the user.

Further, because the required resources are determined at the time when a user requests the web application, rather than at the time of application development, the web application may be customized and/or updated at any time simply by revising the web application organization scheme to incorporate the changes the desired web application changes.

Figure 6:
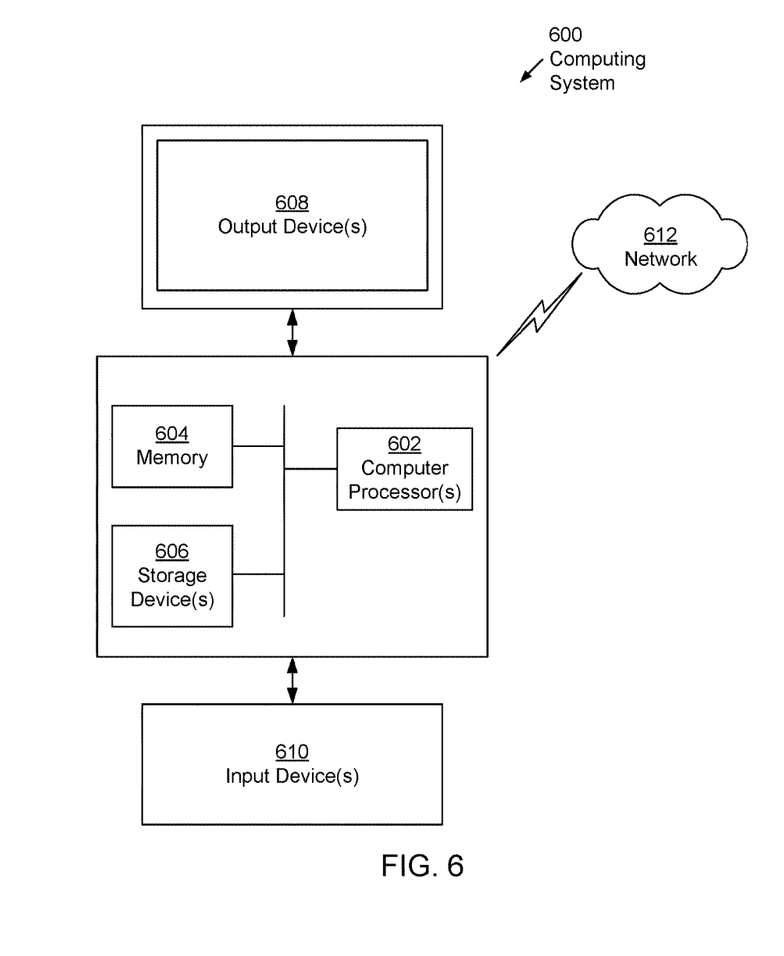
FIG. 6 shows a computing system in accordance with one or more embodiments of the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

Embodiments of the technology may enable a software application to efficiently load resources. Rather than loading a resource when a state of the application, requiring the resource, is accessed, the resource may be loaded preemptively, thus reducing the delay when accessing the state. Multiple prediction methods may be used to increase the likeliness of a correct prediction, regardless of the type of application and user interactions with the application. The prediction algorithms may not generate a significant computational load, thus limiting any negative affect on the application performance.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for scope-sensitive loading of software resources in web applications, comprising:
    obtaining, from a web browser, a request for a web application;
    obtaining a scope of the requested web application,
        wherein the scope determines required web application functionalities and wherein the scope comprises at least one selected from a group consisting of a, a software as a service (SaaS) tenant name, a SaaS subscription name and a SaaS subscription plan;
    based on the scope, generating a list of required software resources that implement the required web application functionalities, wherein generating the list of required software resources comprises:
        identifying, for at least one required web application functionality, in a hierarchically structured web application organization scheme, prerequisite functionalities;
        for at least one identified prerequisite functionality, naming, in the list of required software resources, the software resources associated with the prerequisite, functionality; and
        for at least one required web application functionality, naming, in the list of required software resources, the software resources associated with the required web application functionality;
    collecting the required software resources, based on the list of required software resources;
    providing the collected required software resources to the web browser;
    receiving, after providing the collected required software resources to the web browser, a request for a missing software resource from the web browser; and
    providing the missing software resource to the web browser.

2. The method of claim 1, wherein the list of required software resources is generated after obtaining the request for the web application from the web browser.

3. The method of claim 1, wherein the scope further comprises at least one selected from a group consisting of a user privilege level, a user group privilege level, a subscription level, a user geographic location, a user device type, a user language, a user role, an application version, and availability of an integration service.

4. The method of claim 1, wherein a required software resource is one selected from a group consisting of JavaScript code, Hypertext Markup Language (HTML) code, Cascading Style Sheets (CSS) code, audio content, video content, text content, and configuration information.

5. The method of claim 1, wherein the list of required software resources names the required software resources in an order that considers dependencies between the required software resources.

6. The method of claim 1, wherein the collected required software resources, provided to the web browser, form the web application to be executed in the web browser, in response to the request for the web application, by the web browser.

7. A system for scope-sensitive loading of software resources in web applications, comprising:
    a computing device comprising a computer processor;
    an application server executing on the computer processor, and a web application composition engine executing on the application server;
    wherein the application server is configured to obtain, from a web browser, a request for a web application;
    wherein the web application composition engine is configured to:
        obtain a scope of the requested web application,
            wherein the scope determines required web application functionalities and wherein the scope comprises at least one selected from a group consisting of, a software as a service (SaaS) tenant name, a SaaS subscription name and a SaaS subscription plan;
        based on the scope, generate a list of required software resources that implement the required web application functionalities, wherein generating the list of required software resources comprises:
            identifying, for at least one required web application functionality, in a hierarchically structured web application organization scheme, prerequisite functionalities;
            for at least one identified prerequisite functionality, naming, in the list of required software resources, the software resources associated with the prerequisite functionality;
            for at least one required web application functionality, naming, in the list of required software resources, the software resources associated with the required web application functionality;
        collect the required software resources, based on the list of required software resources;
        provide the collected required software resources to the web browser;
        receive, after providing the collected required software resources to the web browser, a request for a missing software resource from the web browser; and
        provide the missing software resource to the web browser, wherein the web browser is further configured to provide the collected required software resources to the web browser.

8. The system of claim 7, wherein the list of required software resources is generated after obtaining the request for the web application from the web browser.

9. The system of claim 7, wherein the list of required software resources names the required software resources in an order that considers dependencies between the required software resources.

10. The system of claim 7, wherein the collected required software resources, provided to the web browser, form the web application to be executed in the web browser, in response to the request for the web application, by the web browser.

11. A non-transitory computer readable, medium (CRM) storing instructions for scope-sensitive loading of software resources in web applications, the instructions comprising functionality for:

obtaining, from a web browser, a request for a web application;

obtaining a scope of the requested web application, wherein the scope determines required web application functionalities and wherein the scope comprises at least one selected from a group consisting of, a software as a service (SaaS) tenant name, a SaaS subscription name and a SaaS subscription plan;

based on the scope, generating a list of required software resources that implement the required web application functionalities, wherein generating the list of required software resources comprises:

identifying, for at least one required web application functionality, in a hierarchically structured web application organization scheme, prerequisite functionalities;

for at least one identified prerequisite functionality, naming, in the list of required software resources, the software resources associated with the prerequisite functionality; and for at least one required web application functionality, naming, in the list of required software resources, the software resources associated with the required web application functionality;

collecting the required software resources, based on the list of required software resources;

providing the collected required software resources to the web browser;

receiving, after providing the collected required software resources to the web browser, a request for a missing software resource from the web browser; and providing the missing software resource to the web browser.

12. The non-transitory CRM of claim 11, wherein the list of required software resources is generated after obtaining the request for the web application from the web browser.

13. The non-transitory CRM of claim 11, wherein the list of required software resources names the required software resources in an order that considers dependencies between the required software resources.

14. The non-transitory CRM of claim 11, wherein the collected required software resources, provided to the web browser, form the web application to be executed in the web browser, in response to the request for the web application, by the web browser.

* * * * *